(12) United States Patent
Kim

(10) Patent No.: US 7,978,664 B2
(45) Date of Patent: Jul. 12, 2011

(54) METHOD FOR MODEM SWITCHING FOR USE WITH MM-MB TERMINAL

(75) Inventor: Young-Iak Kim, Yongin-si (KR)

(73) Assignee: SK Telecom Co., Ltd., Seoul (KR)

( * ) Notice: Subject to any disclaimer, the term of this patent is extended or adjusted under 35 U.S.C. 154(b) by 316 days.

(21) Appl. No.: 10/575,171

(22) PCT Filed: Oct. 8, 2004

(86) PCT No.: PCT/KR2004/002570
§ 371 (c)(1),
(2), (4) Date: Apr. 7, 2006

(87) PCT Pub. No.: WO2005/034389
PCT Pub. Date: Apr. 14, 2005

(65) Prior Publication Data
US 2007/0104142 A1     May 10, 2007

(30) Foreign Application Priority Data

Oct. 9, 2003   (KR) .................. 10-2003-0070413

(51) Int. Cl.
*H04W 4/00*   (2009.01)

(52) U.S. Cl. ........ 370/338; 455/442; 370/335; 370/441; 370/479; 375/220; 375/221; 375/222

(58) Field of Classification Search .......... 370/310, 370/328, 338, 422.1, 335, 441, 479; 455/403, 455/422.1, 436, 437, 439, 422; 375/220–222
See application file for complete search history.

(56) References Cited

U.S. PATENT DOCUMENTS 5,101,501 A * 3/1992 Gilhousen et al. ............ 455/442

(Continued)

FOREIGN PATENT DOCUMENTS

JP           1995-222227           8/1995

(Continued)

OTHER PUBLICATIONS

Yewen, Li et al, "Policy to Develop the IMT-2000 Network Management System," *Info-tech and Info-net, 2001, Proceedings ICII 2001*, vol. 2:72-76 (2001).

(Continued)

*Primary Examiner* — Rafael Pérez-Gutiérrez
*Assistant Examiner* — Munjal Patel
(74) *Attorney, Agent, or Firm* — Lowe Hauptman Ham & Berner LLP

(57) ABSTRACT

A multimode-multiband terminal includes an RF antenna for transceiving a CDMA-2000 signal and/or a WCDMA signal; an RF transceiver for demodulating a WCDMA pilot signal received from the RF antenna and outputting the demodulated WCDMA pilot signal; a pilot signal measurement unit for measuring an intensity of the demodulated WCDMA pilot signal to generate an Ec/Io; a WCDMA modem and a CDMA-2000 modem for performing a call processing according to protocols defined by a WCDMA standard and a CDMA-2000 standard, respectively; a flash memory for storing therein a modem-to-modem switching program capable of performing a switching between the WCDMA modem and the CDMA-2000 modem based on the Ec/Io; and a controller for loading the modem-to-modem switching program and activating the CDMA-2000 modem if a time lapse during which the Ec/Io is maintained smaller than a predetermined CDMA-2000 ON threshold $TH_{ON}$ is greater than a preset CDMA-2000 ON condition time $H_d$.

20 Claims, 7 Drawing Sheets

U.S. PATENT DOCUMENTS

| | | | |
|---|---|---|---|
| 5,697,055 A * | 12/1997 | Gilhousen et al. | 455/436 |
| 5,917,811 A * | 6/1999 | Weaver et al. | 370/332 |
| 6,275,186 B1 * | 8/2001 | Kong | 342/363 |
| 6,324,401 B1 * | 11/2001 | De Hoz Garcia-Bellido et al. | 455/442 |
| 6,337,983 B1 * | 1/2002 | Bonta et al. | 455/437 |
| 6,363,060 B1 * | 3/2002 | Sarkar | 370/342 |
| 6,567,670 B1 * | 5/2003 | Petersson | 455/522 |
| 6,836,471 B2 * | 12/2004 | Holma et al. | 370/331 |
| 6,937,874 B2 * | 8/2005 | Cramer, III | 455/522 |
| 6,944,142 B2 * | 9/2005 | Grieco | 370/331 |
| 7,054,631 B2 * | 5/2006 | Tee | 455/436 |
| 7,096,020 B2 * | 8/2006 | Choi et al. | 455/439 |
| 7,110,765 B2 * | 9/2006 | Amerga et al. | 455/436 |
| 7,310,528 B2 * | 12/2007 | Natsume | 455/437 |
| 7,349,373 B2 * | 3/2008 | An et al. | 370/331 |
| 2003/0103479 A1 * | 6/2003 | Anderson et al. | 370/335 |
| 2005/0037757 A1 * | 2/2005 | Moon et al. | 455/436 |
| 2006/0013176 A1 * | 1/2006 | De Vos et al. | 370/338 |
| 2007/0280160 A1 * | 12/2007 | Kim et al. | 370/331 |
| 2008/0056190 A1 * | 3/2008 | Kim | 370/331 |

FOREIGN PATENT DOCUMENTS

| | | |
|---|---|---|
| JP | 2001-16286 | 1/2001 |
| KR | 10-2006-0005181 | 1/2006 |
| KR | 10-2006-0018773 | 3/2006 |
| WO | 98/09938 | 3/1998 |
| WO | 01/45295 | 6/2001 |
| WO | 01/67788 | 9/2001 |
| WO | WO-01/67788 A2 | 9/2001 |
| WO | 03/017621 | 2/2003 |
| WO | 03/045076 | 5/2003 |

OTHER PUBLICATIONS

International Search Report for PCT/KR2004/002570, dated Dec. 16, 2004.

Japanese Office Action dated Sep. 30, 2008, for Japanese application No. 2006-532098.

* cited by examiner

METHOD FOR MODEM SWITCHING FOR USE WITH MM-MB TERMINAL

RELATED APPLICATIONS

This application is a 35 U.S.C. 371 national stage filing of International Application No. PCT/KR2005/002570, filed 8 Oct. 2004, which claims priority to Korean Patent Application No. 2003-70413, filed on 9 Oct. 2003 in Korea. The contents of the aforementioned applications are hereby incorporated by reference.

FIELD OF THE INVENTION

The present invention relates to a method for switching between modems in an MM-MB (multimode-multiband) terminals; and, more particularly, to a switching method capable of reducing switching time between modems by way of switching an MM-MB terminal into a CDMA-2000 idle state in advance if a measured intensity of a WCDMA pilot signal satisfies a predetermined condition when the terminal operated in a WCDMA priority mode moves from an overlay zone to a CDMA-2000 zone.

BACKGROUND OF THE INVENTION

Mobile communication services have continuously developed after the $1^{st}$ generation mobile communication service started around late 1980's providing a low-quality voice communication service primarily under analog cellular standards such as AMPS (advanced mobile phone service). The $2^{nd}$ generation mobile communication services have provided both an improved voice communication service and a low speed (14.4 Kbps) data communication service under digital cellular standards such as GSM (global system for mobile), CDMA (code division multiple access) or TDMA (time division multiple access). Furthermore, with the advent of the 2.5 generation mobile communication service, a GHz-level frequency band was used and a PCS (personal communications service) has been developed so that a still further improved voice communication service and a still low speed (144 Kbps) data transfer service may be realized.

A mobile communication network for use in up to 2.5 generation mobile communication services includes various communication equipments such as a user terminal, a base station transmitter, a base station controller, a mobile switching center, a HLR (home location register), a VLR (visitor location register), and so forth.

The $3^{rd}$ generation communication service has been provided in two ways: an asynchronous WCDMA system advocated by 3GPP (generation partnership project); and a synchronous CDMA-2000 system advocated by 3GPP2. Particularly, the WCDMA system is a wireless protocol recommended by IMT-2000, and a great number of communication service operators are now providing or preparing for providing WCDMA services worldwide.

The WCDMA system has advantages of guaranteeing a high speech quality and a great volume of data transmission by using spread spectrum scheme. The WCDMA system adopts a 32 Kbps ADPCM (adaptive differential pulse code modulation) for voice coding and supports a high level of mobility that enables a user to use a voice communication service even while the user moves at a speed of 100 Km per hour. Furthermore, the WCDMA communication method is adopted by the greatest number of countries, and the 3GPP organized by various institutions from South Korea, Europe, Japan, the United States, China, etc., continues to develop technology specifications for the WCDMA services.

Meanwhile, due to the above-described advantages of the WCDMA system, the WCDMA networks have been recently constructed to provide the WCDMA services even in South Korea, the Unites States, China and the like in which the CDMA-2000 services have been fundamentally provided.

Referring to FIG. 1, there is shown a schematic block diagram of a mobile radio communication network capable of providing a WCDMA service in a communication environment in which a CDMA-2000 network is basically constructed.

For the purpose of description, it is assumed that the WCDMA service is offered in some parts within a CDMA-2000 zone 120 in which a CDMA-2000 service is provided. The parts where the WCDMA service is available within the CDMA-2000 zone 120 are referred to as overlay zones 130 and 140. That is to say, a user in the overlay zones can be given either one of the CDMA-2000 service or the WCDMA service selectively. Here, it is obvious that a multimode-multiband (hereinafter, referred to as 'MM-MB') terminal is required for both the CDMA-2000 service and the WCDMA service.

MM-MB terminals 110 and 112 support multi modes and multi bands. Here, the multi modes include a synchronous mode, an asynchronous mode, and the like, while the multi bands include the $2^{nd}$ generation mobile communication services using a frequency band of 800 MHz, the 2.5 generation mobile communication services using a frequency band of 1.8 GHz, the $3^{rd}$ generation mobile communication services using a frequency band of about 2 GHz and a $4^{th}$ generation mobile communication service to be provided in the near future. The MM-MB terminals 110 and 112 may be switched to a WCDMA mode, an IMT-2000 mode, or the like, depending on what type of communication service is provided, in the region where they are currently located.

FIG. 2 is a schematic block diagram showing an internal configuration of the prior art MM-MB terminal 110.

The prior art MM-MB terminal 110 includes an RF (radio frequency) antenna 210, an RF transceiver 220, a filter unit 230, a modem unit 240, a controller 250, and so forth.

The RF antenna 210 receives an RF signal transmitted from a neighboring wireless base station. The RF transceiver 220 receives the RF signal from the RF antenna 210, demodulates the received RF signal and sends the demodulated RF signal to the filter unit 230. Further, the RF transceiver 220 modulates transmission data received via the filter unit 230 and the modem unit 240, and transmits the modulated transmission data via the antenna 210, under the control of the controller 250.

The filter unit 230 and the modem unit 240 include a WCDMA filter 232 and a WCDMA modem 242 for the WCDMA service and a CDMA-2000 filter 234 and a CDMA-2000 modem 244 for the CDMA-2000 service, respectively. Depending on an operating mode of the MM-MB terminal 110, the filter unit 230 extracts a desired digital signal from the demodulated RF signal received from the RF transceiver 220, using either one of the WCDMA filter 232 and the CDMA-2000 filter 234, and transfers the extracted digital signal to the modem unit 240. Further, the modem unit 240 processes the digital signal received from the filter unit 230 and takes charge of a call processing according to a protocol defined by WCDMA or CDMA-2000.

The controller 250 controls the overall operation of the MM-MB terminal 110 and allows the MM-MB terminal 100 to operate selectively in either one of the WCDMA mode and the CDMA-2000 mode, depending on what type of the received RF signal is received (i.e., depending on whether the RF signal is a WCDMA signal or a CDMA-2000 signal). Moreover, if a certain operating mode is selected, the controller 250 transmits a control signal to the modem unit 240 to thereby drive one of the WCDMA modem 242 and the DCMA-2000 modem 244 depending on the selected mode.

Meanwhile, in case the MM-MB terminal 110 moves from the overlay zone 130 to the CDMA-2000 zone 120 or from the CDMA-2000 zone 120 to the overlay zone 130, a switching between the WCDMA mode and the CDMA-2000 mode is required. That is, if the MM-MB terminal 110 that has been receiving the WCDMA service in the overlay zone 130 moves into the CDMA-2000 zone 120, the WCDMA mode of the MM-MB terminal 110 should be switched to the CDMA-2000 mode.

As described with reference to FIG. 2, in order to switch the MM-MB terminal 110 from the WCDMA mode to the CDMA-2000 mode, the WCDMA modem 242 under operation should be stopped and the CDMA-2000 modem 244 should be activated instead. Accordingly, in the conventional mobile communication environment, the MM-MB terminal 110 has to get out of the overlay zone 130 completely, i.e., the WCDMA signal has to be no more received, before the CDMA-2000 modem 244 is activated.

However, in the conventional method in which the MM-MB terminal 100 has to get out of the overlay zone 130 and a call has to be completely disconnected with the WCDMA network before the CDMA-2000 modem is activated, it takes about 10 to 15 seconds for the MM-MB terminal 110 to switch its operating mode from the WCDMA mode to the CDMA-2000 mode. Therefore, there occurs a problem that the MM-MB terminal 110 moving from the overlay zone 130 to the CDMA-2000 zone 120 cannot use the mobile communication service at all during a relatively long time ranging from 10 to 15 seconds required to be completely switched to the CDMA-2000 mode.

Even though the above description has been provided for the movement of the MM-MB terminal 110 from the overlay zone 130 into the CDMA-2000 zone, same problem may occur in the reverse case, i.e., when the MM-MB terminal 110 in the CDMA-2000 zone 120 moves into the overlay zone 140.

SUMMARY OF THE INVENTION

It is, therefore, an object of the present invention to provide a switching method capable of reducing a switching time between modems by way of switching an MM-MB terminal into a CDMA-2000 idle state in advance if a measured intensity of a WCDMA pilot signal satisfies a predetermined condition when the terminal operated in a WCDMA priority mode moves from an overlay zone to a CDMA-2000 zone.

In accordance with a first preferred embodiment of the present invention, there is provided a method for switching between modems, each modem being employed in an MM-MB (multimode-multiband) terminal being under a WCDMA idle state, when the MM-MB terminal moves from an overlay zone into a CDMA-2000 zone, comprising the steps of: (a) receiving a WCDMA signal transmitted from a WCDMA system, and measuring an Ec/Io (energy of carrier/interference of others) by using the WCDMA signal; (b) determining whether the Ec/Io is smaller than a predetermined CDMA-2000 ON threshold $TH_{ON}$; (c) if the Ec/Io is smaller than the $TH_{ON}$, driving a timer to measure a time lapse, and determining whether the time lapse exceeds a preset CDMA-2000 ON condition time $H_d$; (d) if the time lapse exceeds the $H_d$, activating a CDMA-2000 modem; and (e) performing an initialization for a CDMA-2000 system to switch the MM-MB terminal into a CDMA-2000 idle state.

In accordance with a second preferred embodiment of the present invention, there is provided a method for switching between modems, each modem employed in an MM-MB terminal being under a WCDMA traffic state when the MM-MB terminal moves from an overlay zone into a CDMA-2000 zone, comprising the steps of: (a) receiving a WCDMA signal transmitted from a WCDMA system, and measuring an Ec/Io (energy of carrier/interference of others) by using the WCDMA signal; (b) determining whether the Ec/Io is smaller than a predetermined CDMA-2000 ON threshold $TH_{ON}$; (c) if the Ec/Io is smaller than the $Th_{ON}$, driving a timer to measure a time lapse, and determining whether the time lapse exceeds a preset CDMA-2000 ON condition time $H_d$; (d) if the time lapse exceeds the $H_d$, activating a CDMA-2000 modem, and determining whether a WCDMA call is terminated; and (e) if the WCDMA call is determined to be terminated, performing an initialization for a CDMA-2000 system to switch the MM-MB terminal into a CDMA-2000 idle state.

In accordance with a third preferred embodiment of the present invention, there is provided a method for switching between modems, each modem being employed in an MM-MB (multimode-multiband) terminal being under a CDMA-2000 idle state, when the MM-MB terminal moves from a CDMA-2000 zone into an overlay zone, comprising the steps of: (a) monitoring a paging channel periodically while maintaining the MM-MB terminal in the CDMA-2000 idle state; (b) analyzing an overhead message received from a CDMA-2000 system and determining whether the MM-MB terminal is located in the overlay zone; (c) if the MM-MB terminal is determined to be located in the overlay zone, activating a WCDMA modem; and (d) performing an initialization process for a WCDMA system to switch the MM-MB terminal into a WCDMA idle state.

In accordance with a fourth preferred embodiment of the present invention, there is provided a method for switching between modems, each modem being employed in an MM-MB (multimode-multiband) terminal being under a CDMA-2000 traffic state, when the MM-MB terminal moves from a CDMA-2000 zone into an overlay zone, comprising the steps of: (a) monitoring a paging channel periodically while maintaining the MM-MB terminal in the CDMA-2000 traffic state; (b) analyzing an overhead message received from a CDMA-2000 system and determining whether the MM-MB terminal is located in the overlay zone; (c) if the MM-MB terminal is determined to be located in the overlay zone, determining whether a CDMA-2000 call is terminated while maintaining the MM-MB terminal in the CDMA-2000 traffic state; (d) if the CDMA-2000 call is determined to be terminated, activating a WCDMA modem; and (e) performing an initialization process for a WCDMA system to switch the MM-MB terminal into a WCDMA idle state.

In accordance with a fifth preferred embodiment of the present invention, there is provided a multimode-multiband terminal capable of accommodating both a synchronous CDMA-2000 service and an asynchronous WCDMA service and operating in at least two frequency bands, comprising: an RE (radio frequency) antenna for transceiving a CDMA-2000 signal and/or a WCDMA signal; an RF transceiver for demodulating a WCDMA pilot signal received from the RF antenna and outputting the demodulated WCDMA pilot signal; a pilot signal measurement unit for measuring an intensity of the demodulated WCDMA pilot signal to generate an Ec/Io; a WCDMA modem and a CDMA-2000 modem for processing a digital signal received from the RF transceiver and performing a call processing according to protocols defined by a WCDMA standard and a CDMA-2000 standard, respectively; a flash memory for storing a modem-to-modem switching program capable of performing a switching between the WCDMA modem and the CDMA-2000 modem based on an Ec/Io; and a controller for loading the modem-to-modem switching program and activating the CDMA-2000 modem if a time lapse during which the Ec/Io is maintained smaller than a predetermined CDMA-2000 ON threshold $TH_{ON}$, is greater than a preset CDMA-2000 ON condition time $H_d$.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
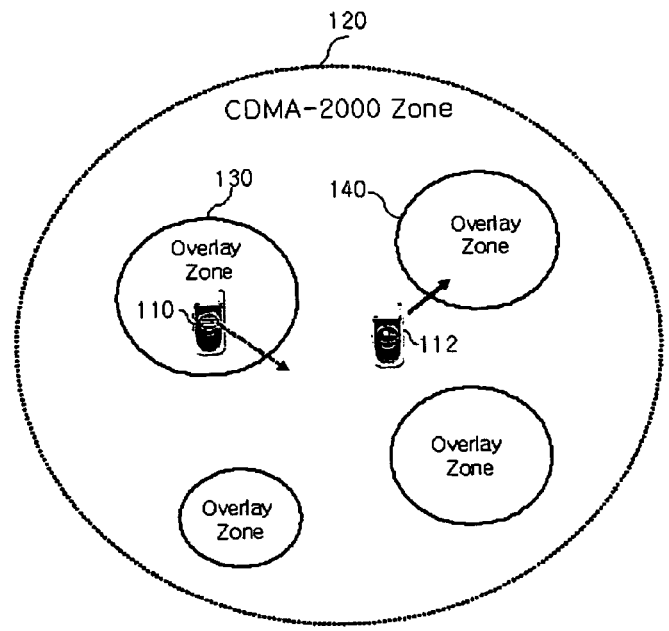
FIG. 1 is a schematic block diagram showing a mobile radio communication network capable of providing a WCDMA service in a communication environment in which a CDMA-2000 network is basically constructed.

Hereinafter, preferred embodiments of the present invention will be described in detail with reference to the accompanying drawings. Here, like reference numerals represent like parts in various drawings. Further, it is notable that detailed description of known parts or functions will be omitted if there is a concern that the description of such parts or functions would render the technical essence of the present invention obscure.

Figure 3:
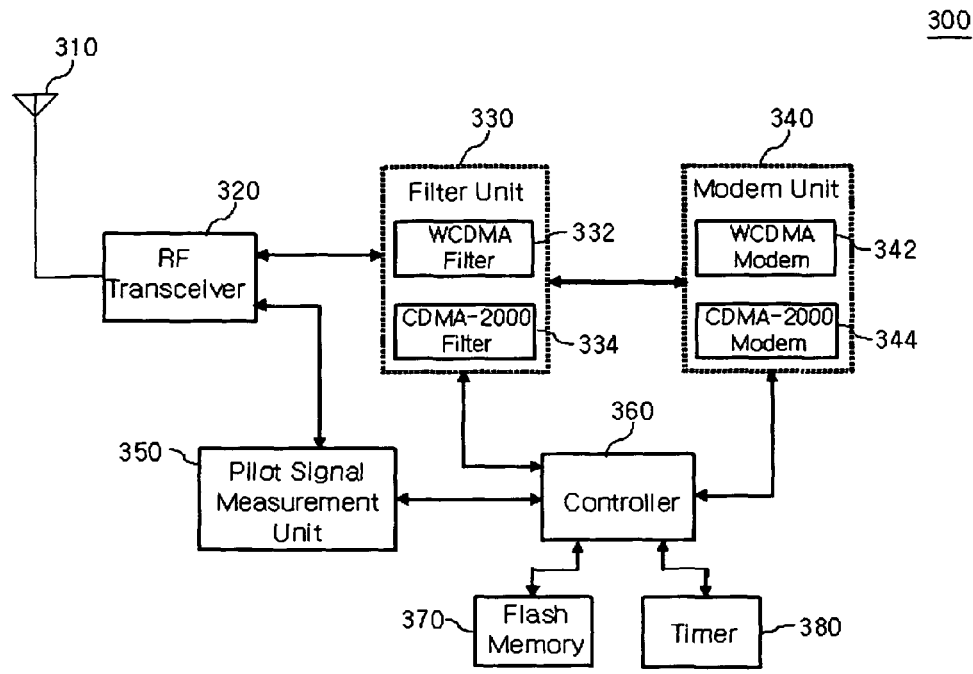
FIG. 3 sets forth a schematic block diagram showing an internal configuration of an MM-MB terminal in accordance with a preferred embodiment of the present invention.

Referring to FIG. 3, there is provided a schematic block diagram showing an internal configuration of an MM-MB terminal 300 in accordance with a preferred embodiment of the present invention.

Figure 2:
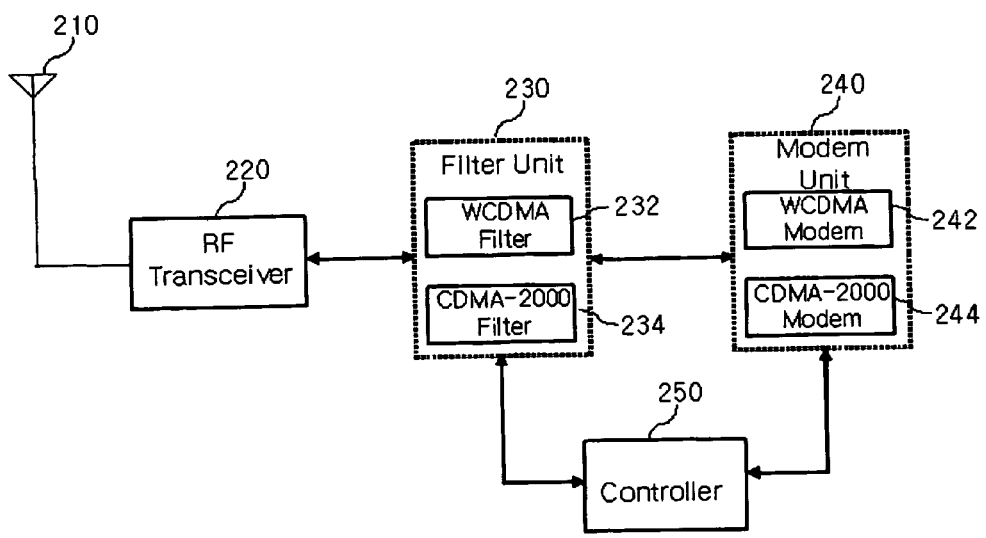
FIG. 2 presents a schematic block diagram showing an internal configuration of a prior art MM-MB terminal.

Like the MM-MB terminal 110 shown in FIG. 2, the MM-MB terminal 300 in accordance with the preferred embodiment of the present invention also includes an RF antenna 310, an RF transceiver 320, a filter unit 330, a modem unit 340 and a controller 360. Accordingly, the detailed description of the same parts as described in FIG. 2 will be omitted and instead distinctive parts will be focused and elaborated. The MM-MB terminal 300 carries out a rapid switching between a WCDMA modem 342 and a CDMA-2000 modem 344 by using a pilot signal measurement unit 350, a flash memory 370 and a timer 380.

A switching process between modems in the MM-MB terminal 300 in accordance with the preferred embodiment of the present invention will now be described. Here, it is assumed that the MM-MB terminal located in the overlay zone is basically operated in a WCDMA priority mode for inspecting the frequency band used in the WCDMA system in accordance with the preferred embodiment of the present invention.

The pilot signal measurement unit 350 of the MM-MB terminal 300 operated in the WCDMA priority mode receives a WCDMA pilot signal via the RF antenna 310 and the RF transceiver 320 and measures an Ec/Ic (energy of carrier/interference of others) from the received WCDMA pilot signal. Then, the pilot signal measurement unit 350 sends the measured Ec/Io of the WCDMA pilot signal to the controller 360.

Herein, the Ec/Io represents a ratio of the signal intensity of the pilot channel to the total power of received noise and is used to indicate the signal quality of the pilot channel. In general, the Ec/Io ranges from about −1 to about −2 dB at a region where the traffic is not busy, and the radio waves are not overlapped, while it ranges from about −6 to about −12 dB at a region where the traffic is busy and the radio waves are slightly overlapped. Specifically, the Ec/Io of about −10 dB may be measured at the upper floors of high-story buildings where the radio waves are highly overlapped. A voice disconnect phenomenon starts to occur under the Ec/Io of about −10 to −14 dB, and a call conversation cannot be continued any more if the Ec/Io falls below −14 dB.

Furthermore, the WCDMA pilot signal is transmitted through a CPICH (common pilot channel) of forward physical channels. A single slot in the common pilot channel consists of 2560 chips or 10 symbols of 20 bits. 15 slots constitute a single frame and the total number of such frames is 72.

The controller 360 detects the Ec/Io received from the pilot signal measurement unit 350 and continuously checks whether the Ec/Io falls below a preset CDMA-2000 ON threshold $TH_{ON}$ required for the activation of the CDMA-2000 modem 344. At the moment the Ec/Io falls below the $TH_{ON}$, the controller 360 generates and sends a driving signal to the timer 380 to allow the timer 380 to measure a time lapse. Here, the time lapse refers to a cumulative time during which the Ec/Io is maintained smaller than the $TH_{ON}$ (Ec/Io<$TH_{ON}$) prior to the activation of the CDMA-2000 modem. If the measured time lapse starts to exceed a predetermined CDMA-2000 ON condition time $H_d$, the controller 360 allows the CDMA-2000 modem 344 to be activated. Furthermore, once the CDMA-2000 modem 344 is activated, the controller 360 generates and transmits an inactivation signal to stop activating the WCDMA modem 342. It takes approximately several seconds until the WCDMA modem 342 is inactivated.

Meanwhile, in accordance with the present invention, the flash memory 370 stores a modem-to-modem switching program which allows the controller 360 to perform a modem-to-modem switching process promptly by using the Ec/Io received from the pilot signal measurement unit 50. Accordingly, the controller 360 may load the modem-to-modem switching program stored in the flash memory 370 if the Ec/Io measured by the pilot signal measurement unit 350 becomes smaller than the predetermined $TH_{ON}$ or if the received system information is analyzed to reveal that the terminal enters the overlay zone.

Figure 4:
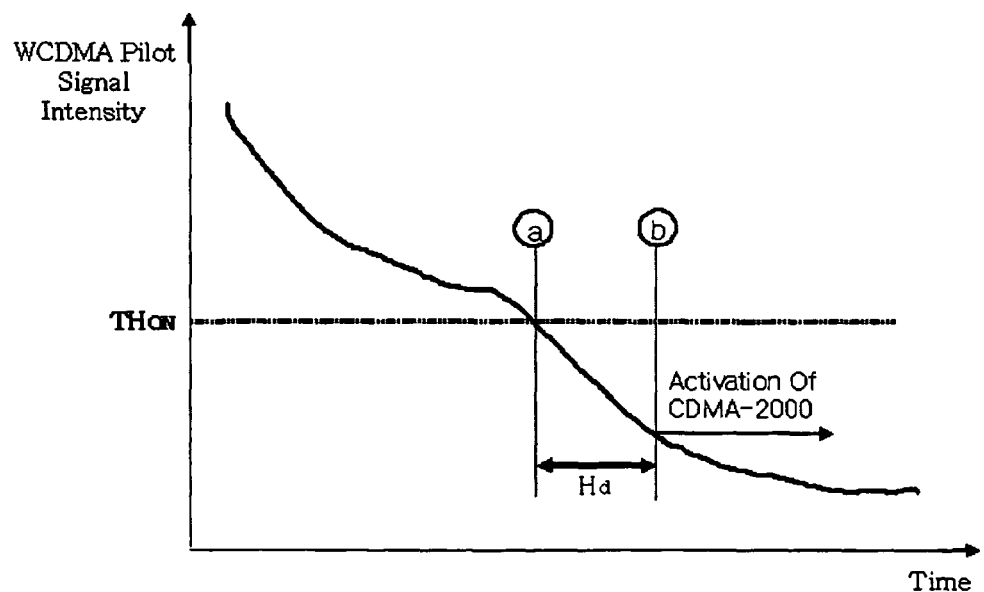
FIG. 4 depicts a graph describing an activation condition of a CDMA-2000 modem when an MM-MB terminal under an idle state moves from an overlay zone into a CDMA-2000 zone in accordance with a first preferred embodiment of the present invention.

FIG. 4 presents a graph describing an activation condition of the CDMA-2000 modem in case the MM-MB terminal under a WCDMA idle state moves from the overlay zone into the CDMA-2000 zone in accordance with a first preferred embodiment of the present invention.

The MM-MB terminal 300 operated in the WCDMA priority mode in the overlay zone starts to measure the time lapse at a time point ⓐ when the Ec/Io received from a wireless base station such as a UTRAN (Universal Mobile Telecommunications Systems (UMTS) Terrestrial Radio Access Network) of the WCDMA network becomes smaller than the preset $TH_{ON}$. Then, the MM-MB terminal 300 allows the CDMA-2000 modem 344 to be activated at a time point ⓑ when the time lapse exceeds the predetermined CDMA-2000 ON condition time $H_d$. Here, since the MM-MB terminal 300 has not been out of the overlay zone yet even after the time point ⓑ, the WCDMA pilot signals may have been received continuously.

Since the CDMA-2000 modem 344 is activated in advance, at the time point ⓑ on the graph as described above, a switching to the CDMA-2000 mode is performed in advance before the MM-MB terminal enters the CDMA-2000 zone, so that a time period required for carrying out the modem-to-modem switching operation can be greatly reduced.

Figure 5:
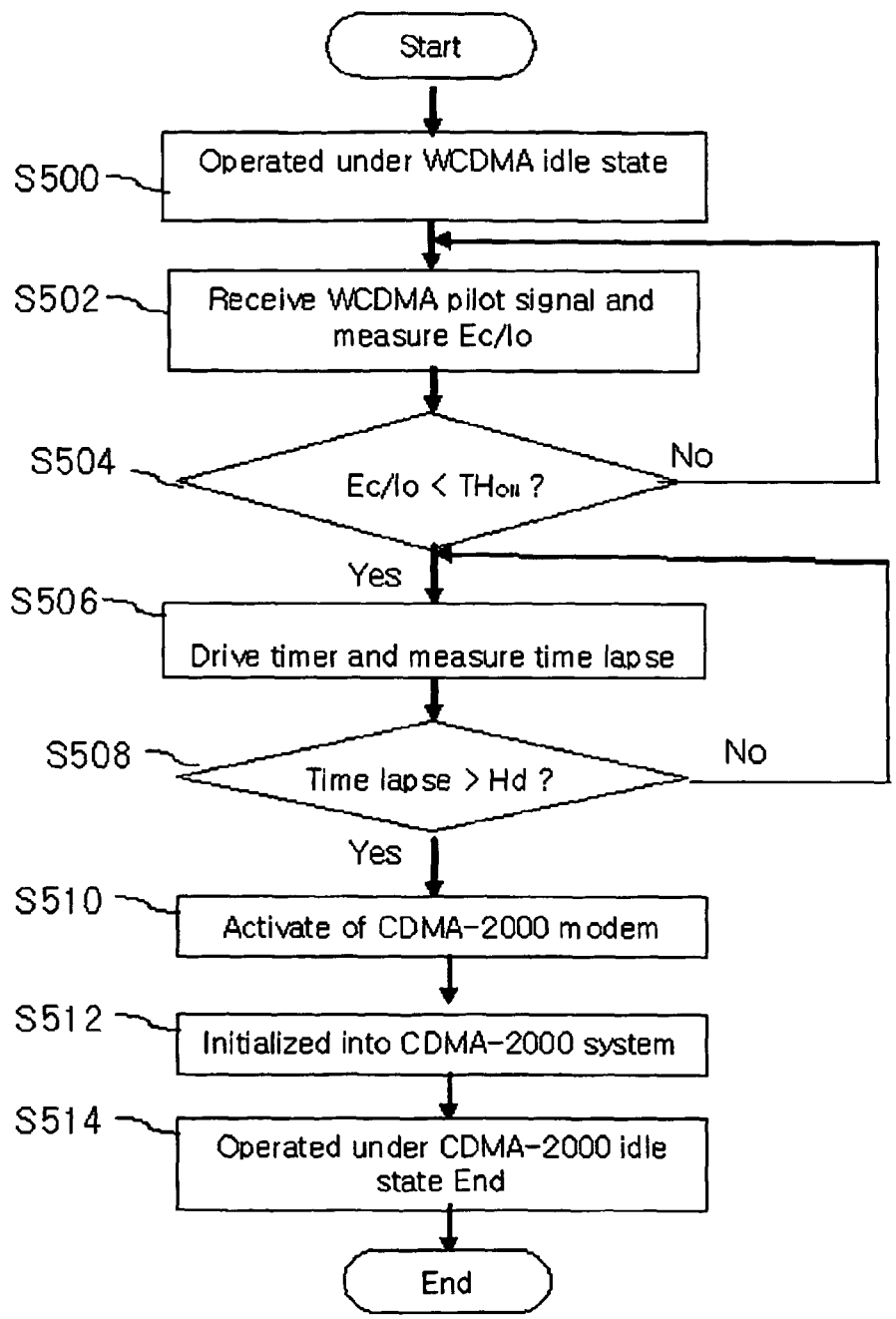
FIG. 5 provides a flow diagram describing an, activation sequence of CDMA-2000 modem when the MM-MB terminal under the idle state moves from the overlay zone into the CDMA-2000 zone in accordance with the first embodiment of the present invention.

Referring to FIG. 5, there is provided a flow cart that describes an activation sequence of the CDMA-2000 modem when the MM-MB terminal under the WCDMA idle state moves from the overlay zone into the CDMA-2000 zone.

Referring to FIGS. 3 and 5 together, in the overlay zone, the MM-MB terminal 300 is operated under the WCDMA idle state where it receives the WCDMA pilot signal included in the common pilot channel of the WCDMA system and periodically inspects a paging channel message (S500). Then, the MM-MB terminal 300 measures the Ec/Io from the received WCDMA pilot signal (S502).

Thereafter, the controller 360 of the MM-MB terminal 300 determines whether the measured Ec/Io is smaller than a $TH_{ON}$ (S504). If it is determined at step S504 that the Ec/Io is smaller than the $TH_{ON}$, the controller 360 of the MM-MB terminal 300 drives the built-in timer 380 and measures the time lapse (S506).

The controller keeps determining whether the measured time lapse exceeds the predetermined CDMA-2000 ON condition time $H_d$ (S508). If the detection result at step S508 reveals that the measured time lapse exceeds the CDMA-2000 ON condition time $H_d$, the controller 360 controls the CDMA-2000 modem 344 to be activated (S510).

After the CDMA-2000 modem 344 is activated at step S510, the MM-MB terminal 300 performs an initialization into the CDMA-2000 system (S512). Here, the initialization refers to an operation for setting information required for the terminal and creating an environment for the transition into an idle state. The initialization is performed through a system determination substate, a pilot channel acquisition substate, a synchronous channel acquisition substate, and so forth, in order. Since the terminal initialization is well known in the art, the detailed description thereof will be omitted.

After completing the initialization at step S512, the MM-MB terminal 300 is switched into a CDMA-2000 idle state (S514).

Figure 6:
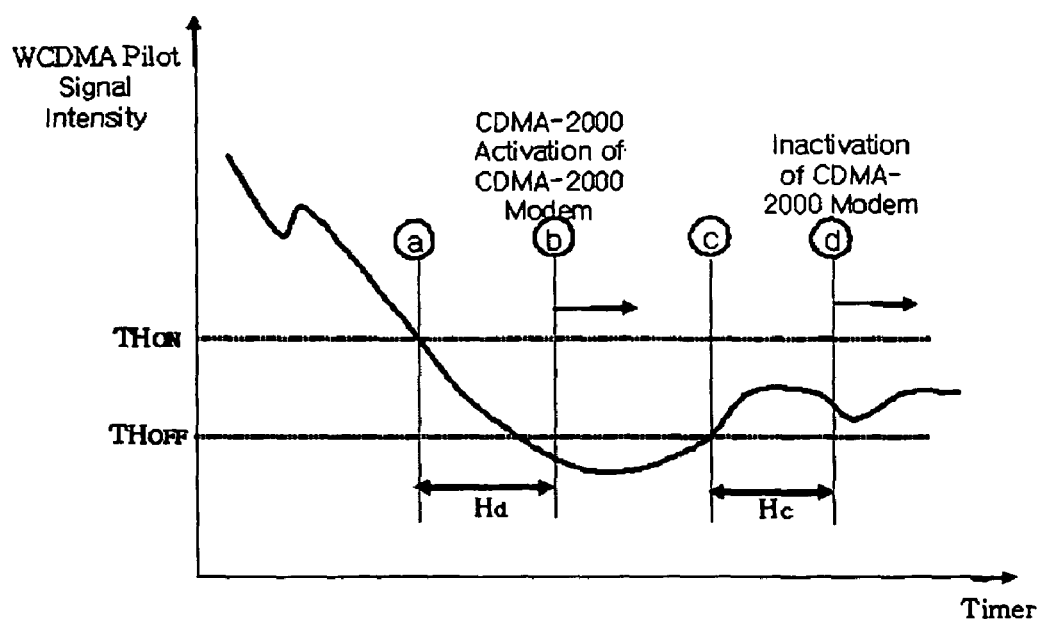
FIG. 6 shows a graph describing an activation condition of a CDMA-2000 modem when an MM-MB terminal under a traffic state moves from an overlay zone into a CDMA-2000 zone in accordance with a second preferred embodiment of the present invention.

FIG. 6 sets forth a graph describing an activation condition of the CDMA-2000 modem 344 when the MM-MB terminal under a WCDMA traffic state moves from the overlay zone to the CDMA-2000 zone in accordance with a second preferred embodiment of the present invention.

The MM-MB terminal 300 under the WCDMA traffic state in accordance with the second embodiment of the present invention is also operated under the WCDMA priority mode in the overlay zone, and the principles and the sequence for the activation of the CDMA-2000 modem 344 by using an Ec/Io received from the UTRAN are identical to those described in FIG. 4.

However, the difference between the first and the second embodiment is that the MM-MB terminal 300 in accordance with the second embodiment continues detecting the Ec/Io even after the time point ⓑ when the CDMA-2000 modem 344 is activated under the WCDMA traffic state. Since the MM-MB terminal 300 may not have been out of the overlay zone even after the time point ⓑ, the WCDMA pilot signal can be continually received. That is, even though the CDMA-2000 modem 344 is activated, the MM-MB terminal 300 controls the WCDMA modem 342 to maintain to be activated and receives the WCDMA pilot signal continually until the initialization into the CDMA-2000 system is completed.

Meanwhile, if the initialization into the CDMA-2000 system has not been completed, the MM-MB terminal 300 continues to determine whether the Ec/Io from the received WCDMA pilot signal is larger than a preset CDMA-2000 OFF threshold $TH_{OFF}$ required for inactivating the CDMA-2000 modem 344 under operation.

At a time point ⓒ when the measured Ec/Io starts to exceed the $TH_{Off}$, the controller 360 generates and sends a driving signal to the built-in timer 380, to thereby allow the timer 380 to measure a time lapse. Here, the time lapse refers to a cumulative time during which the Ec/Io is maintained greater than the $TH_{OFF}$ prior to the inactivation the CDMA-2000 modem 344.

The controller 360 controls the CDMA-2000 modem 344 to be inactivated at the moment the measured time lapse starts to exceed a predetermined CDMA-2000 OFF condition time $H_c$ (at a time point ⓓ). At this time, since a WCDMA call connection between the MM-MB terminal 300 and the WCDMA system is not terminated, the MM-MB terminal 300 may maintain the WCDMA traffic state, i.e., the initial state thereof, if the CDMA-2000 modem 344 is inactivated.

As described above, if the Ec/Io satisfies a specific condition, the CDMA-2000 modem 344 can be inactivated even after it has been activated under the WCDMA traffic state. As a result, a power consumption of a battery in the MM-MB terminal 300 can be reduced.

Figure 7:
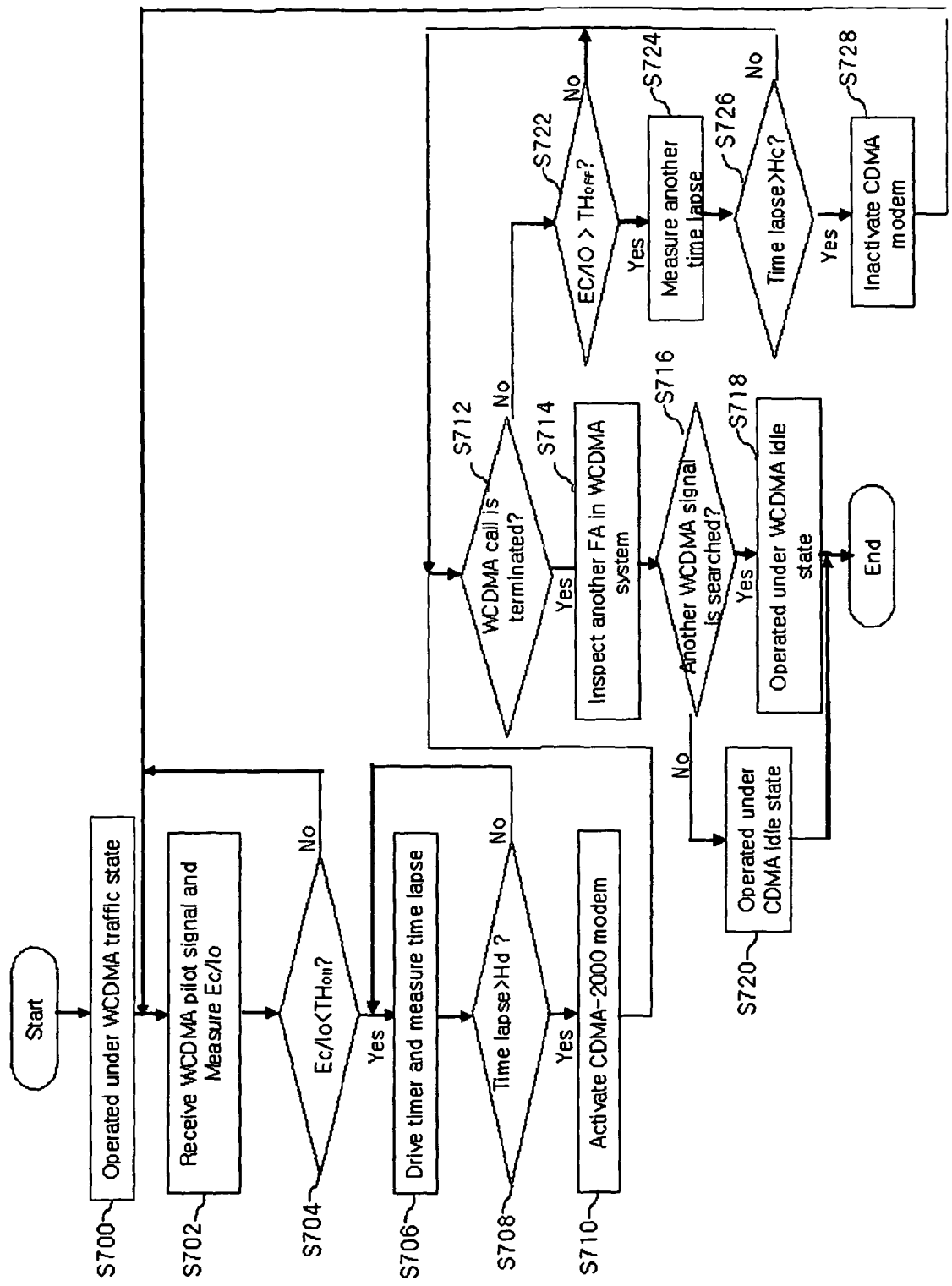
FIG. 7 offers a flow diagram describing an activation sequence of the CDMA-2000 modem when the MM-MB terminal under the traffic state moves from the overlay zone into the CDMA-2000 zone in accordance with the second embodiment of the present invention.

FIG. 7 is a flow diagram that describes an activation sequence of the CDMA-2000 modem 344 when the MM-MB terminal under the traffic state moves from the overlay zone into the CDMA-2000 zone in accordance with the second embodiment of the present invention.

Referring to FIGS. 3 and 7 together, the MM-MB terminal in the overlay zone is operated under the WCDMA traffic state where it transceives a voice signal or packet data via the WCDMA system and a traffic channel (S700). Steps S702 to S710 are identical to steps S502 to S510 described in FIG. 5, and thus the detailed explanation thereof will be omitted.

The MM-MB terminal 300 determines whether a WCDMA call under the WCDMA traffic state is terminated (S712). If it is determined at step S712 that the WCDMA call is terminated, the MM-MB terminal 300 inspects another service channel, i.e., FA (frequency assignment), in the WCDMA system (S714).

Then, the MM-MB terminal 300 determines whether another WCDMA signal is searched at step S714 (S716). If step S716 determines to reveal that the WCDMA signal is searched, the MM-MB terminal 300 is switched into the WCDMA idle state (S718). If otherwise, i.e., if it is determined at step S716 that no WCDMA signal is searched, the MM-MB terminal 300 is switched into the CDMA-2000 idle state (S720). Here, in order to switch the MM-MB terminal 300 into the CDMA-2000 idle state, the same terminal initialization into the CDMA-2000 system as descried at step S512 of FIG. 5 should be carried out in advance.

Meanwhile, the above-described steps 714 to 718 may be optional and thus may be omitted. That is to say, steps S714 to S718 may be required for allowing the MM-MB terminal 300 to keep connected with the WCDMA system by retrieving a neighboring service channel, even if the WCDMA call gets accidentally disconnected while the MM-MB terminal 300 does not satisfy the activation condition of the CDMA-2000 modem 344. Accordingly, if the faster switching of the MM-MB terminal 300 into the CDMA-2000 idle state is primary concern, steps S714 to S718 may be omitted and, in the step 720, the MM-MB terminal 300 can be switched into the CDMA-2000 idle state directly upon the termination of the WCDMA call.

Referring back to step S712, if it is determined that that the WCDMA call is not terminated, the MM-MB terminal 300 further determines whether the Ec/Io from the received WCDMA pilot signal exceeds the predetermined $TH_{OFF}$ (S722). If step S722 reveals that the Ec/Io is greater than the $TH_{OFF}$, the MM-MB terminal 300 drives the built-in timer 380 to measuring a time lapse (S724). On the other hand, if step S722 shows that the Ec/Io is not greater than the $TH_{OFF}$, the process goes back to step S712 to determine whether the WCDMA call is terminated.

The MM-MB terminal 300 determines whether the time lapse measured at step S724 exceeds the CDMA-2000 OFF condition time $H_c$ (S726). If step S726 reveals that the time lapse starts to exceed the $H_c$, the MM-MB terminal 300 renders the CDMA-2000 modem 344 inactivated (S728). Then, the MM-MB terminal 300 with the CDMA-2000 modem 344 inactivated goes to step S702 and repeats step S702 to measure the Ec/Io from a received WCDMA pilot signal.

On the other hand, if step S726 reveals that the time lapse does not exceed the $H_c$, the MM-MB terminal 300 goes to step S712 to determine whether the WCDMA call is terminated.

Figure 8:
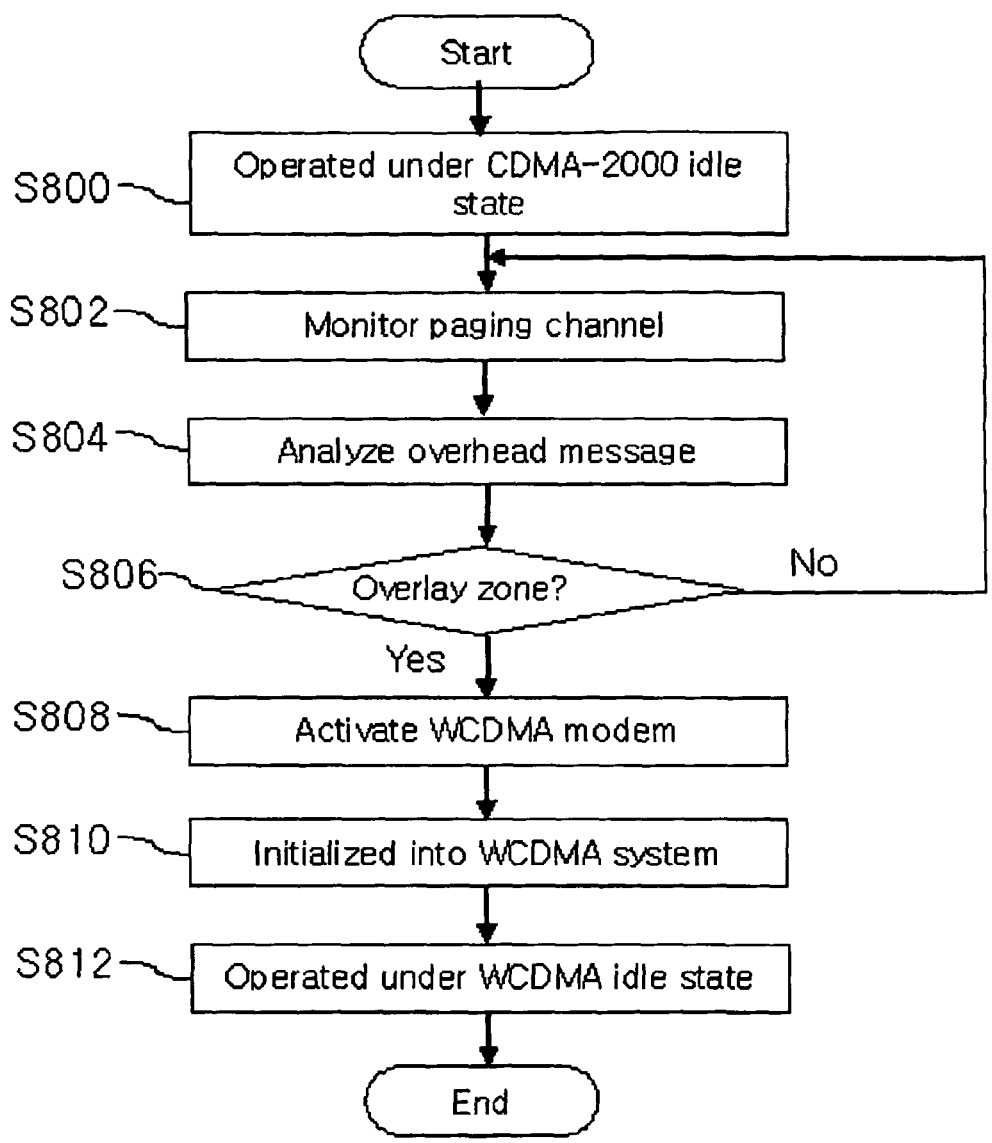
FIG. 8 presents a flow diagram describing an activation sequence of a WCDMA modem when an MM-MB terminal under an idle state moves from CDMA-2000 zone into an overlay zone in accordance with a third preferred embodiment of the present invention.

Referring to FIG. 8, there is provided a flow diagram that describes an activation sequence of the WCDMA modem 342 when the MM-MB terminal under a CDMA-2000 idle state moves from a CDMA-2000 zone into an overlay zone in accordance with a third preferred embodiment of the present invention.

Referring to FIGS. 3 and 8 together, the MM-MB terminal 300 is under the CDMA-2000 idle state in the CDMA-2000 zone (S800). The MM-MB terminal 300 under the CDMA-2000 idle state periodically monitors a paging channel to detect paging channel messages (S802). In general, all types of state information of the CDMA-2000 system and access information needed for the terminal to access to the system are transmitted from the system to the terminal every 1.28 seconds through the paging channel.

The MM-MB terminal 300 analyzes an overhead message among the paging channel messages transmitted from the CDMA-2000 system (S804). Here, the overhead message refers to a message transmitted to all the terminals registered to the system and generally classified into configuration parameters and access parameters. The configuration parameters generally include configuration information on the system itself and its neighboring systems while the access parameters include information required for the terminal to access the system.

Particularly, the configuration parameter includes a system parameter message, a neighbor list message, a CDMA channel list message, an expansion system parameter message, etc. Here, the system parameter message is the most important message for transmitting system information, and includes system information, registration-related information, handoff information, power control information, etc., wherein the system information includes PN (pseudo noise) code, SID (system identification), NID (network identification) and Base ID (base identification).

The MM-MB terminal 300 identifies the Base ID information from the system parameter message received and analyzed at step S804 and determines based on the Base ID information whether the MM-MB terminal 300 itself is located in the overlay zone (S806). If it is determined at step S806 that the MM-MB terminal 300 is in the overlay zone, the MM-MB terminal 300 renders the WCDMA modem 344 activated'(S808).

After activating the WCDMA modem 344, the MM-MB terminal 300 carries out an initialization process for the WCDMA system (S810). Since the initialization process for the WCDMA system performed by the MM-MB terminal 300 is similar to that described at step S512 in FIG. 5, the detailed description thereof will be omitted. When the WCDMA system initialization has been completed at step S810, the MM-MB terminal 300 is switched into the WCDMA idle state (S812).

Figure 9:
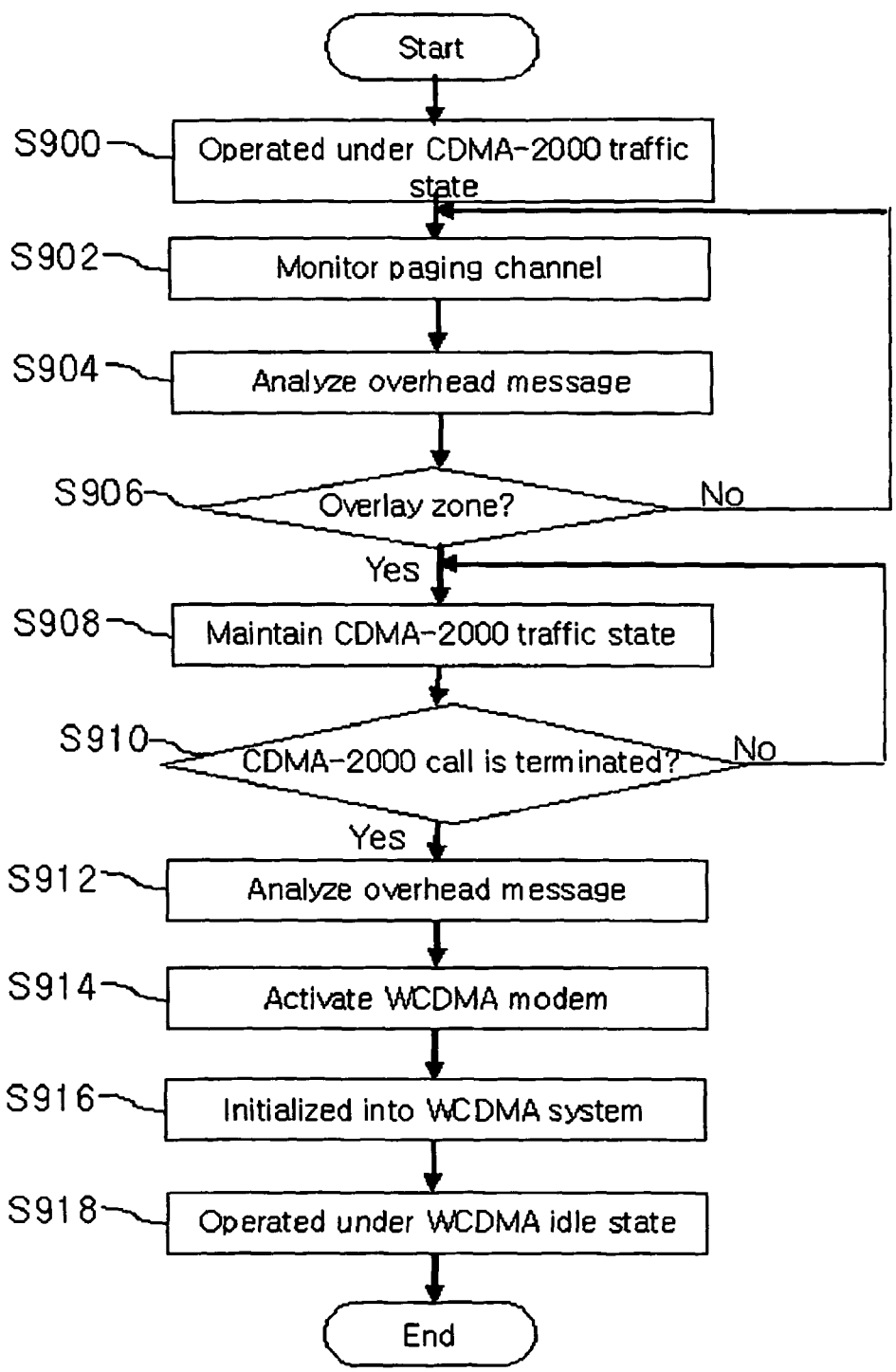
FIG. 9 sets forth a flow diagram describing an activation sequence of a WCDMA modem when an MM-MB terminal, under a traffic state moves from a CDMA-2000 zone into an overlay zone in accordance with a fourth preferred embodiment of the present invention.

FIG. 9 is a flow diagram that describes an activation sequence of the WCDMA modem 342 when the MM-MB terminal under the CDMA-2000 traffic state moves from a CDMA-2000 zone into an overlay zone in accordance with a fourth preferred embodiment of the present invention.

Referring to FIGS. 3 and 9 together, the MM-MB terminal 300 is under the CDMA-2000 traffic state where it transceives a voice signal and packet data via the CDMA-2000 system and a traffic channel (S900). Steps S902 to S906 are identical to steps S802 to S806 described in FIG. 8 so that the detailed description thereof will be omitted.

Even though it is determined at step S906 that the MM-MB terminal 300 is in the overlay zone, the MM-MB terminal 300 maintains the CDMA-2000 traffic state without prompt activation of the WCDMA modem 344 since the CDMA-2000 service is still available in the overlay zone (S908). Then, the MM-MB terminal 300 with the CDMA-2000 traffic state continuously maintained determines whether a CDMA-2000 call is terminated (S910).

If it is determined at step S910 that the CDMA-2000, call is terminated, the MM-MB terminal 300 analyzes an overhead message transmitted from a CDMA-2000 wireless base station (S912). Specifically, the MM-MB terminal 300 finds out that the overlay zone is given under the WCDMA priority mode through analyzing the received overhead message at step S912. After detecting that the MM-MB terminal 300 is located in the region under the WCDMA priority mode, the MM-MB terminal 300 renders the WCDMA modem activated (S914). The MM-MB terminal 300 with the WCDMA modem activated performs an initialization into the WCDMA system (S916) and is switched into the WCDMA idle state (S918).

As descried above, the conventional MM-MB terminal has a disadvantage in that a relatively long time is required for performing the switching between the built-in WCDMA modem and the built-in CDMA-2000 modem in the MM-MB terminal. However, in accordance with the present invention, the signal intensity of the WCDMA signal received by the MM-MB terminal located in the overlay zone is continually detected and, if the signal intensity falls below a predetermined level, the CDMA-2000 modem has been activated in advance, so that the modem-to-modem switching time can be greatly reduced.

Moreover, even if the CDMA-200 modem has been activated in advance, the CDMA-2000 modem can be inactivated when the intensity of the WCDMA signal maintains above a preset level during a predetermined time, and accordingly, a power consumption of a battery in the MM-MB terminal can be minimized.

While the invention has been shown and described with respect to the preferred embodiments, it will be understood by those skilled in the art that various changes and modifications may be made without departing from the spirit and scope of the invention as defined in the following claims.

What is claimed is:

1. A method of switching between a WCDMA modem and a CDMA-2000 modem of an MM-MB (multimode-multiband) terminal, when the MM-MB terminal being in a WCDMA idle state moves from an overlay zone into a CDMA-2000 zone, said method comprising the steps of:
   (a) receiving a WCDMA signal transmitted from a WCDMA system, and measuring an Ec/Io (energy of carrier/interference of others) value by using the WCDMA signal;
   (b) determining whether the Ec/Io value is lower than a predetermined CDMA-2000 ON threshold $TH_{ON}$;
   (c) if it is determined at step (b) that the Ec/Io value is lower than $TH_{ON}$, starting to measure a time lapse, wherein the time lapse is a cumulative time during which the Ec/Io value remains lower than the CDMA-2000 ON threshold $TH_{ON}$, and determining whether the time lapse exceeds a preset CDMA-2000 ON condition time $H_d$;
   (d) if it is determined at step (c) that the time lapse exceeds $H_d$, activating the CDMA-2000 modem, wherein the CDMA-2000 modem is activated before the MM-MB terminal leaves the overlay zone and while the WCDMA modem is still being activated to keep the MM-MB terminal in the WCDMA idle state; and
   (e) performing an initialization for a CDMA-2000 system to switch the MM-MB terminal from the WCDMA idle state into a CDMA-2000 idle state.

2. The method of claim 1, wherein
the MM-MB terminal inspects a CPICH (common pilot channel) periodically to receive the WCDMA signal at step (a).

3. The method of claim 1, wherein the initialization at step (e) is performed through a system determination substate, a pilot channel acquisition substate and a synchronous channel acquisition sub state.

4. The method of claim 1, wherein, after being switched into the CDMA-2000 idle state at step (e), the MM-MB terminal deactivates the WCDMA modem.

5. A method of switching between a WCDMA modem and a CDMA-2000 modem of an MM-MB terminal, when the MM-MB terminal moves from an overlay zone into a CDMA-2000 zone while handling a WCDMA call, said method comprising the steps of:
   (a) while the MM-MB terminal is handling the WCDMA call by the active WCDMA modem, receiving a WCDMA signal transmitted from a WCDMA system, and measuring an Ec/Io (energy of carrier/interference of others) value by using the WCDMA signal;
   (b) determining whether the Ec/Io value is lower than a predetermined CDMA-2000 ON threshold $TH_{ON}$;
   (c) if it is determined at step (b) that the Ec/Io value is lower than $TH_{ON}$, starting to measure a time lapse, wherein the time lapse is a cumulative time during which the Ec/Io value remains lower than the CDMA-2000 ON threshold $TH_{ON}$, and determining whether the time lapse exceeds a preset CDMA-2000 ON condition time $H_d$;
   (d) before the MM-MB terminal leaves the overlay zone and while the WCDMA modem is still actively handling the WCDMA call, if it is determined at step (c) that the time lapse exceeds $H_d$, activating the CDMA-2000 modem, and then determining whether the WCDMA call has been terminated; and
   (e) if the WCDMA call is determined at step (d) to have been terminated, performing an initialization for a CDMA-2000 system to switch the MM-MB terminal into a CDMA-2000 idle state.

6. The method of claim 5, wherein
the MM-MB terminal inspects a CPICH (common pilot channel) periodically to receive the WCDMA signal at step (a); and
the CDMA-2000 modem is activated in step (d) while the WCDMA call is still being handled by the WCDMA modem.

7. The method of claim 5, wherein, if the WCDMA call is determined at step (d) to have not been terminated, the method further includes the steps of:
   (d1) determining whether the Ec/Io value is higher than a predetermined CDMA-2000 OFF threshold $TH_{OFF}$ which is lower than $TH_{ON}$;
   (d2) if it is determined at step (d1) that the Ec/Io value is higher than $TH_{OFF}$, starting to measure another time lapse, wherein said another time lapse is a cumulative time during which the Ec/Io value remains higher than $TH_{OFF}$, and determining whether said another time lapse exceeds a preset CDMA-2000 OFF condition time $H_c$;
   (d3) if it is determined at step (d2) that said another time lapse exceeds $H_c$, deactivating the CDMA-2000 modem that has been activated at step (d) and returning to step (a).

8. The method of claim 7, wherein, if it is determined at step (d1) that the Ec/Io value is not higher than $TH_{OFF}$, the MM-MB terminal returns to step (d) to determine once more whether the WCDMA call has been terminated.

9. The method of claim 7, wherein the CDMA-2000 modem is deactivated at step (d3) regardless of whether the Ec/Io value is higher than $TH_{ON}$ or not.

10. The method of claim 8, wherein, if it is determined at step (d2) that the another time lapse does not exceed the CDMA-2000 OFF condition time $H_c$, the MM-MB terminal returns to step (d) to determine once more whether the WCDMA call has been terminated.

11. The method of claim 5, wherein step (e) further includes the sub-steps of:
   (e1) inspecting another service channel FA (frequency assignment) of the WCDMA system;
   (e2) determining whether another WCDMA signal is found; and (e3) if said another WCDMA signal is found, switching the MM-MB terminal into a WCDMA idle state.

12. The method of claim 11, wherein, if it is determined at sub-step (e2) that no other WCDMA signal is found, the MM-MB terminal performs said initialization into the CDMA-2000 system to be switched into said CDMA-2000 idle state.

13. The method of claim 12, wherein, after being switched into the CDMA-2000 idle state, the MM-MB terminal deactivates the WCDMA modem.

14. A multimode-multiband terminal capable of accommodating both a synchronous CDMA-2000 service and an asynchronous WCDMA service and operating in at least two frequency bands, said terminal comprising:
 an RF (radio frequency) antenna for transceiving a CDMA-2000 signal and/or a WCDMA signal;
 an RF transceiver coupled to the RF antenna for demodulating a WCDMA pilot signal received from the RF antenna and outputting the demodulated WCDMA pilot signal;
 a pilot signal measurement unit coupled to the RF transceiver for measuring an intensity of the demodulated WCDMA pilot signal to generate an Ec/Io value;
 a WCDMA modem and a CDMA-2000 modem coupled to the RF transceiver for processing a digital signal received from the RF transceiver and performing a call processing according to protocols defined by a WCDMA standard and a CDMA-2000 standard, respectively;
 a memory for storing a modem-to-modem switching program configured for switching between the WCDMA modem and the CDMA-2000 modem based the Ec/Io value; and
 a controller coupled to the pilot signal measurement unit, the memory and the WCDMA and CDMA-2000 modems for
  (i) receiving the Ec/Io value from the pilot signal measurement unit, and
  (ii) loading and executing the modem-to-modem switching program from the memory to activate the CDMA-2000 modem, while the WCDMA modem is still being activated, if a time lapse, during which the Ec/Io value remains lower than a predetermined CDMA-2000 ON threshold $TH_{ON}$, is greater than a preset CDMA-2000 ON condition time $H_d$.

15. The multimode-multiband terminal of claim 14, wherein the controller loads the modem-to-modem switching program at the moment the Ec/Io value starts to be lower than the CDMA-2000 ON threshold $TH_{ON}$ or when it is determined that the multimode-multiband terminal enters an overlay zone by analyzing system information.

16. The multimode-multiband terminal of claim 14, wherein, only after the CDMA-2000 modem has been activated and an initialization into a CDMA-2000 system has been completed so that the multimode-multiband terminal has been completely switched into a CDMA-2000 idle state, does the controller deactivate the WCDMA modem.

17. The multimode-multiband terminal of claim 14, wherein, even if the CDMA-2000 modem has been activated, based on the Ec/Io value being lower than $TH_{ON}$ during the time lapse greater than $H_d$, the controller still deactivates the CDMA-2000 modem if another time lapse, during which the Ec/Io value is maintained higher than a predetermined CDMA-2000 OFF threshold $TH_{OFF}$, is greater than a preset CDMA-2000 OFF condition time $H_c$,
 wherein $TH_{ON}$ is greater than $TH_{OFF}$.

18. The multimode-multiband terminal of claim 14, wherein, only after the WCDMA modem has been activated and an initialization into a WCDMA system has been completed so that the multimode-multiband terminal has been completely switched into a WCDMA idle state, does the controller deactivate the CDMA-2000 modem.

19. The multimode-multiband terminal of claim 17, wherein information upon the CDMA-2000 ON threshold $TH_{ON}$, the CDMA-2000 ON condition time $H_d$, the CDMA-2000 OFF threshold $TH_{OFF}$ and the CDMA-2000 OFF condition time $H_c$, are stored in the memory.

20. The multimode-multiband terminal of claim 14, further comprising a timer for measuring the time lapse and reporting the time lapse to the controller.

* * * * *